US009607660B2

(12) United States Patent
Bennett, II et al.

(10) Patent No.: US 9,607,660 B2
(45) Date of Patent: Mar. 28, 2017

(54) CARRIER USED FOR MOUNTING DATA STORAGE DRIVE INTO ENCLOSURE

(71) Applicant: Seagate Technology LLC, Cupertino, CA (US)

(72) Inventors: Richard E. Bennett, II, Colorado Springs, CO (US); Odie Killen, Colorado Springs, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 15 days.

(21) Appl. No.: 14/723,780

(22) Filed: May 28, 2015

(65) Prior Publication Data

US 2016/0353600 A1    Dec. 1, 2016

(51) Int. Cl.
H05K 7/14 (2006.01)
G11B 33/00 (2006.01)

(52) U.S. Cl.
CPC ..................................... G11B 33/00 (2013.01)

(58) Field of Classification Search
None
See application file for complete search history.

(56) References Cited

U.S. PATENT DOCUMENTS

| 4,022,326 | A | * | 5/1977 | Marconi | H05K 7/1418 211/41.17 |
| 5,652,695 | A | | 7/1997 | Schmitt | |
| 6,317,329 | B1 | * | 11/2001 | Dowdy | H05K 7/1418 312/223.3 |
| 6,407,913 | B1 | | 6/2002 | Peachey et al. | |
| 6,529,383 | B1 | * | 3/2003 | Barringer | H05K 7/1409 211/41.17 |
| 6,603,657 | B2 | * | 8/2003 | Tanzer | G06F 1/187 361/679.33 |
| 7,088,579 | B1 | | 8/2006 | Konshak | |
| 7,778,017 | B2 | * | 8/2010 | Huang | G06F 1/187 248/318 |
| 8,411,446 | B2 | * | 4/2013 | Becklin | G06F 1/182 206/594 |
| 8,599,550 | B2 | | 12/2013 | Davis et al. | |
| 2002/0044419 | A1 | | 4/2002 | Salinas et al. | |
| 2013/0314868 | A1 | * | 11/2013 | Tsai | G06F 1/187 361/679.33 |
| 2014/0022723 | A1 | | 1/2014 | Yang et al. | |

OTHER PUBLICATIONS

Mar. 2, 2015, "Icy Tip: The Best Screw-less 2.5" to 3.5" SATA SSD/HDD Mounting Bracket for Computer Maker and System Integrator", printed from internet on Mar. 2, 2015, 2 pages.
Mar. 2, 2015, "Bracket-252B 2.5" Dual HDD/SSD Screwless Bracket for 3.5" Drive Bay (Blue)", printed from internet on Mar. 2, 2015, 1 page.

* cited by examiner

Primary Examiner — Xanthia C Cunningham
(74) Attorney, Agent, or Firm — Hollingsworth Davis, LLC

(57) ABSTRACT

A data storage carrier includes a middle member with at least one handle between ends of the middle member. Side members are coupled to the respective ends of the middle member via living hinges. The side members each include at least two protrusions configured to interface with side mounting holes of a data storage drive. The living hinges are bendable so that the protrusions interface with the side mounting holes of the drive and the middle member interfaces with a back side of the drive.

20 Claims, 4 Drawing Sheets

CARRIER USED FOR MOUNTING DATA STORAGE DRIVE INTO ENCLOSURE

SUMMARY

The present disclosure is related to a carrier used to mount a bare data storage drive into an enclosure. In one embodiment, an apparatus includes a middle member with at least one handle between first and second ends of the middle member. First and second side members are coupled to the respective first and second ends of the middle member via first and second living hinges, the first and second side members each comprising at least two protrusions configured to interface with side mounting holes of a bare data storage drive. The first and second living hinges are bendable so that the protrusions interface with the side mounting holes of the bare data storage drive and the middle member interfaces with a back side of the bare data storage drive.

In another embodiment, a method involves installing a carrier onto a bare data storage drive. The carrier encompasses two sides and a back side of the bare data storage drive. The method further involves inserting the carrier and bare data storage drive into upper divider slots of an enclosure. The carrier and bare data storage drive are pushed into the enclosure until side members of the carrier interface with lower divider slots. The carrier and bare data storage drive are pushed further into the enclosure until a connector of the drive interfaces with a backplane connector of the enclosure.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to enclosures used for mounting multiple data storage devices. For example, a storage enclosure includes facilities for mechanically and electrically coupling a large number of hard drives or other devices (e.g., solid-state drives, optical drives, tape drives, monitoring devices) in a single enclosure. Generally, the enclosure may include a backplane circuit board that provides data and power connectivity for the individual devices. Such enclosure may include dedicated processors for managing data inputs and outputs to other nodes of a computing system. For example, a mass-storage enclosure may be configured as a storage server that provides persistent storage for nodes of a networked data center.

In one application, known as cold storage, a storage server is used to store data that is gathered and saved but not often accessed. For example, a digital surveillance system may continuously gather data via sensors (e.g., cameras, microphones, etc.) and store the data in a cold storage server. The cold storage server may be configured as a network attached storage (NAS) device and receive the data via a network. The likelihood that a particular file will be accessed again is low, and so at any given a time, only a small percentage of the individual storage devices (e.g., hard disk drives) will be operating, e.g., recording newly received data.

Unlike some applications where a large number of drives may be active at once (e.g., web or email services), cold storage applications may allow relaxing some requirements on storage servers. For example, vibrations caused by mechanical operations within a hard disk drive (e.g., spinning of disks, seeking of read/write heads) can be induced into other hard drives that are mechanically coupled in a single enclosure. The cumulative effect of vibrations induced by a large number of drives in a single enclosure can reduce performance (e.g., cause mis-tracking) if not dealt with, e.g., by using vibration isolating mounts, more expensive servo controls, etc. If it is unlikely that more than a small percentage of hard disk drives will be operating at one time within a single enclosure, then vibration mitigation requirements can be relaxed. Other device requirements, e.g., thermal, noise, electromagnetic interference, etc., may also be relaxed in cold storage server chassis.

Figure 1:
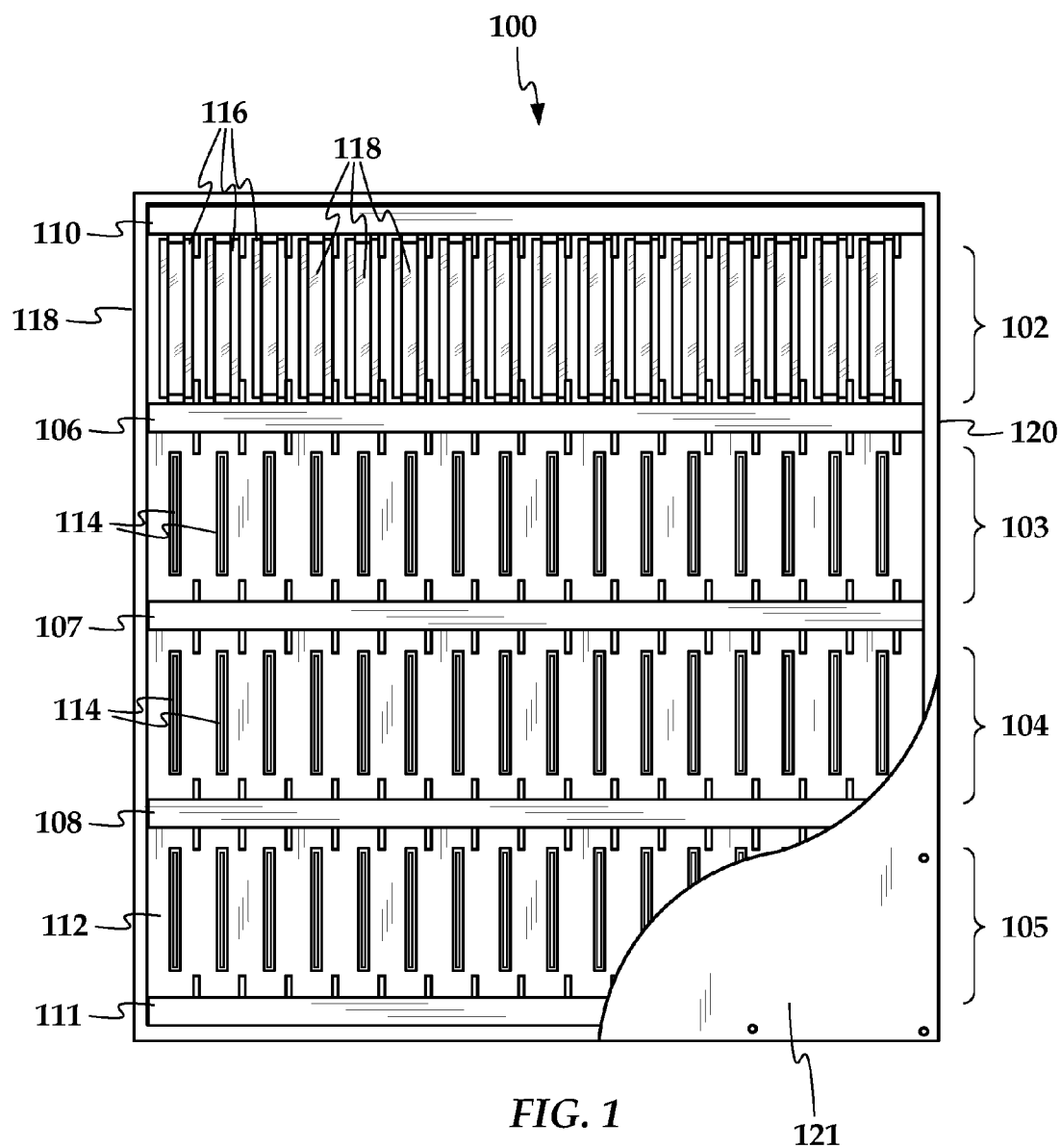
FIG. 1 is a top view of an enclosure according to an example embodiment.

In embodiments described herein, a tool-less mounting system for data storage devices includes a carrier and chassis dividers that facilitate dense mounting of the data storage devices in an enclosure. For purposes of the following discussion, the example data storage devices are described as bard hard disk drives, however the carrier and chassis divider can be used with any storage device as described above. An example enclosure 100 is shown in the top view of FIG. 1. The enclosure 100 includes rows 102-105 that each store an array of hard disk drives or other compatible devices. Row 102 is shown with hard drives installed, and rows 103-105 are shown without hard drives or other devices installed.

Upper divider rails 106-108 are located between the rows 102-105. End rails 110, 111 are on one side of rows 102, 105, and may be identical to upper divider rails 106-108 or may be different, e.g., having drive guiding features on only one side. At least some of the upper divider rails 106-108 may be affixed (e.g., rigidly mounted) to walls 118, 120 of the enclosure 100, and thus provide structural support to the enclosure 110. Additional lower divider rails (not shown) are mounted to (or otherwise proximate to) a backplane circuit board 112. The backplane 112 includes connectors 114 that provide data and power coupling to hard disk drives 116 mounted in the enclosure 100. The backplane 112 includes traces and circuitry that couple the hard disk drives 116 (and other devices) to input/output busses as known in the art.

Each of the hard disk drives 116 are mounted in the enclosure via a carrier 118 that interfaces with (e.g., is directly coupled with) the upper dividers 106 and lower dividers. Otherwise, the hard disk drives 116 do not require any other mounting hardware. This allows bare hard disk drives 116 to be added to the enclosure by wrapping a bare drive 116 with a carrier 118 and sliding the assembly into guiding features of the top and bottom dividers without using any intermediate structures. For purposes of this disclosure, a bare hard drive includes a hard drive as shipped from a manufacturer without any additional mounting hardware. Generally, bare hard drives of the same physical specification (e.g., 2.5" form factor, 3.5" form factor) may be interchangeable physically and electrically regardless of manufacturer, and so the carrier 118 may be used interchangeably with any hard disk drive of a particular physical specification.

The top and bottom dividers run parallel with each other, and serve, among other things, to align the hard disk 116 with the connectors 114. Generally, the upper divider rails 106 provide rough positioning of the hard disk 116 and carrier 118 in a slot, and the lower divider rails provide fine alignment to ensure proper engagement with connector 114. The carriers 118 and dividers may have features (e.g., latches) that mechanically hold the hard disk drives 116 in place after installment, e.g., to prevent the drives from sliding back out of the enclosure 110. Instead or in addition, the carriers 118 may have protrusions that interface with a cover 121. In such a case, the cover 121 holds the hard disk drives 116 against the connectors 114 when fastened to the enclosure 100.

Figure 2:
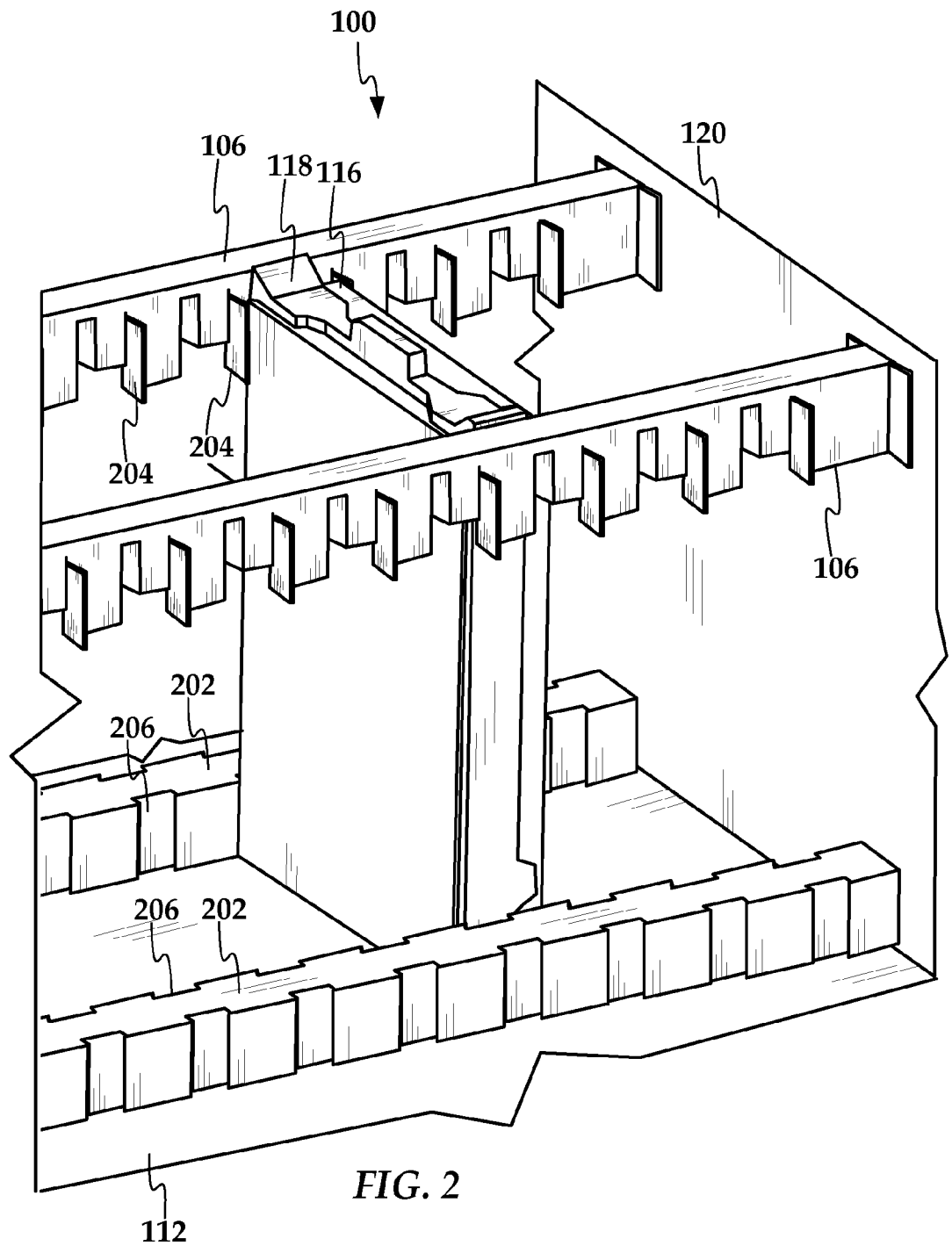
FIG. 2 is a perspective cutaway view of the enclosure shown in FIG. 1.

In FIG. 2, a perspective cutaway view shows additional details of the enclosure 100. A single hard disk drive 116 and carrier 118 are shown installed. In this view, the lower divider rails 202 can be seen. The upper divider rails 106 include guiding features (in this case tabs 204) that facilitate lining the hard disk drive 116 in a slot. The lower divider rails 202 include guiding features (in this case dovetail grooves 206) that facilitate fine alignment between a connector side of the hard disk drive 116 and a connector (not shown in this view) on the backplane 112. These guiding features 204, 206 provide mechanical support for the hard disk drive 116 after it has been installed.

As previously noted the upper divider rails 106 are attached to a walls 118, 120 of the enclosure 100 (one of which is seen in FIG. 2), thereby providing structural support for the structure 100 as well as acting as guides and supports for the hard disk drives 116. The lower divider rails 202 may also be attached to the walls of 118, 120 of the enclosure 100, as well as being attached to the backplane 112. When connected to the backplane 112, the lower divider rails 202 can help to stiffen the backplane 112.

The upper and lower divider rails 106, 202 can be made from any materials. For example, the upper divider rails 106 may be formed from stamped sheet metal, molded from plastic, machined from metal/plastic/composite, 3-D printed, etc. The lower divider rails 202 may be molded from plastic as well, although other materials (e.g., metal, composites) may be used. The upper and lower divider rails 106, 202 and the carriers 118 may have friction features that offer some resistance to prevent the carriers 118 sliding out after they are fully seated but before they are secured, e.g., via a cover or latching mechanism. For example, a rubber-like finish on any of the upper and lower divider rails 106, 202 and the carriers 118 may provide some resistance to movement between the carrier 118 and the rails 106, 202 while still being smooth enough to allow easy insertion and removal. Such a finish may also help dampen vibrations during use of the enclosure.

Figure 3:
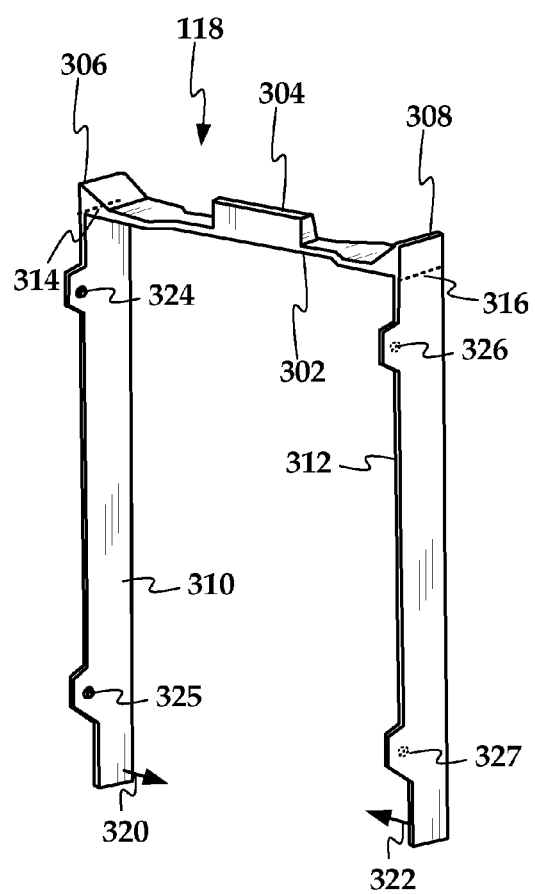
FIGS. 3 and 4 are perspective views of a hard drive carrier according to example embodiments.
Figure 4:
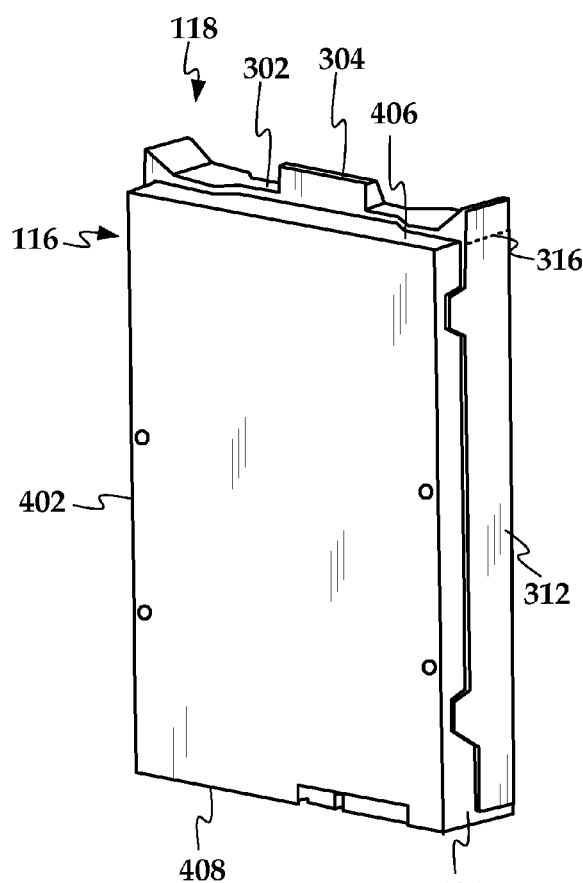

Perspective views in FIGS. 3 and 4 show additional details of the carrier 118. The carrier 118 has a middle member 302 that includes at least one handle 304 between first and second ends 306, 308 of the middle member 302. First and second side members 310, 312 are coupled to the respective first and second ends 306, 308 of the middle member 302 via first and second living hinges 314, 316. The first and second side members 310, 312 each include at least two protrusions 324-327 configured to interface with side mounting holes (e.g., threaded holes) of a bare hard disk drive 116. The first and second living hinges 314, 316 are bendable so that the protrusions 324-327 interface with first and second sides 402, 404 of the bare hard drive and the middle member 302 interfaces with a back side 406 of the bare hard disk drive 116. The back side 406 of the bare hard drive 116 faces away from a connector side 408 of the bare hard drive 116. When the carrier 118 and hard drive 116 are installed into the enclosure 100, the upper and lower guide rails 106, 202 hold the protrusions 324-327 into the side mounting holes of the hard disk drive 116, which prevents slippage therebetween.

The first and second ends 306, 308 of the middle member 302 include protrusions that may be held in place by a cover of a hard drive enclosure. This allows holding the carrier 118 and hard drive 116 in place against backplane connectors without requiring each carrier to have a selectably lockable and releasable mechanism (e.g., latches) to facilitate removing the hard disk drives 116. In some embodiments, the carrier 118 may include a latch or other holding means that can be released upon application of sufficient force on the handle 304, or by actuation of a lever, slide, or other actuating member.

The living hinges 314, 316 are features (e.g., creases, channels) built into the carrier 118 that allows the side members 310, 312 can move relative to the middle member 302. The living hinges 314, 316 may be formed with a preload or bias, such that they are slightly bent inwards, as represented by arrows 320, 322 in FIG. 3. The preload force assists holding the protrusions 324-327 into the hard disk mounting holes so that the carrier 118 holds itself in place on the hard disk drive 116. After the carrier 118 and hard drive 116 are slid into the divider rails of the enclosure, the divider rails ensure the hard disk drive 116 does not move out of the carrier 118.

The carrier 118 may include dimensions that are compatible with an industry standard physical specification. This ensures the carrier 118 can be used with any brand or version of hard disk drive. An example of this type of industry specification is SFF-8301. By making the carrier SFF-8301 compliant, it will work with off-the-shelf 3.5" form factor hard drives or other devices (e.g., optical drives, solid-state drives, tape drives, random-access-memory drives, etc.).

Generally, the carrier 118 may be made from any material, including metal or plastic. When mounted to the hard disk drive 116 (or other compatible device), the carrier 118 does not take up significant volume, and therefore allows devices to be densely mounted within an enclosure. The carrier 118 and mating parts of the divider rails may include relatively soft materials to provide some level of vibration isolation. Further, while the hard drive connectors will provide electrical grounding for the hard disk drove 116, the carrier 118 may include conductive paths or materials that provide addition grounding to the case of the hard disk drive 116. In such a case, the upper and/or lower rails may include similar conductive materials/paths that provide a ground path, e.g., to the enclosure chassis, walls, etc.

Figure 5:
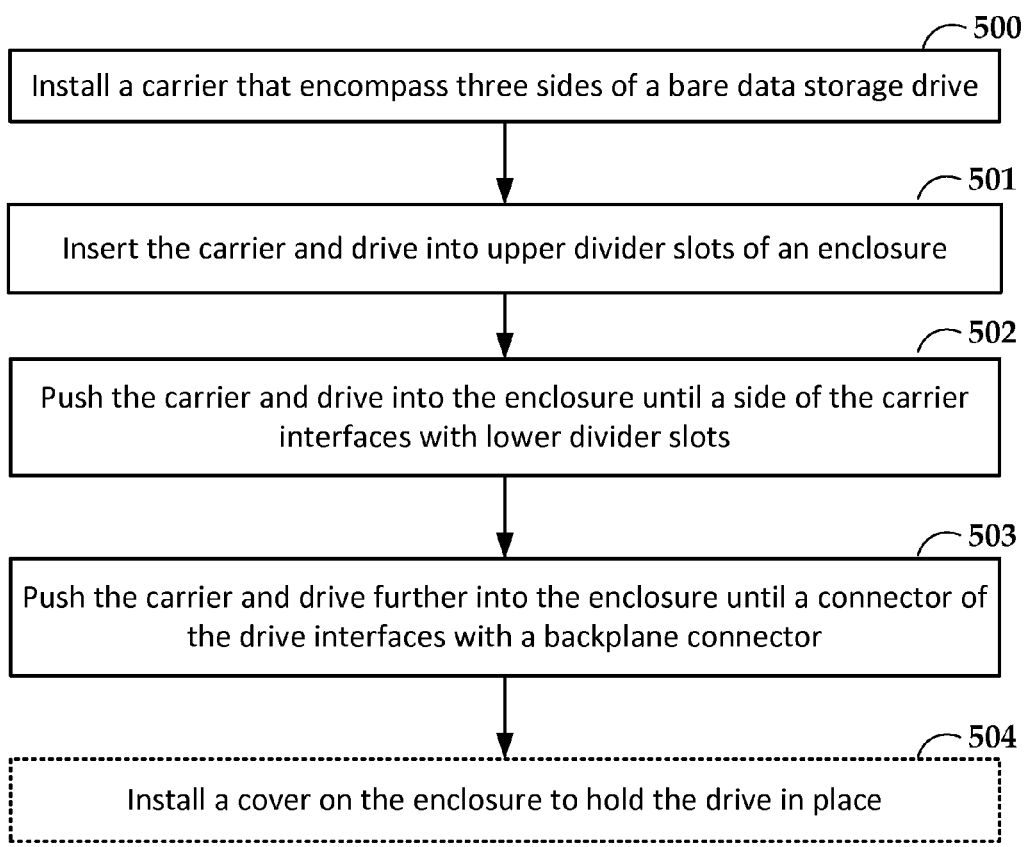
FIG. 5 is a flowchart of a method according to an example embodiment.

In FIG. 5, a flowchart illustrates a method according to an example embodiment. The method involves installing 500 a carrier that encompass three sides of a bare data storage drive. For example, the carrier may include a middle member spanning a back side of the bare data storage drive and side members coupled to the middle member via living hinges. The living hinges may be formed such that they assert a preload force on the side members when installed on the bare data storage drive. In such a case, installing the carriers involves flexing the side members outward and aligning protrusions on the side members with side mounting holes on the data storage drive. Releasing the members causes the protrusions into the mounting holes due to the preload force of the living hinges.

The method further involves inserting 501 the carrier and drive into upper divider slots of an enclosure. For example the upper dividers may include tabs facing inwards between the dividers, and the carrier may rest on the slots as it is being inserted 501. The carrier and drive 502 are pushed into the enclosure until a side of the carrier interfaces with lower divider slots. For example, the lower divider may include dovetail slots and the carriers having a dovetail post that fits tightly into the slot. The carrier and drive are pushed 503 further into the enclosure until a connector of the drive interfaces with a backplane connector. A cover may optionally be installed 504 on the enclosure to hold the drive in place. For example, when fasteners or other members that hold the cover in place are tightened, this causes the cover to press on protrusions facing out of the carriers.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
a middle member comprising at least one handle between first and second ends of the middle member; and
first and second side members coupled to the respective first and second ends of the middle member via first and second living hinges, the first and second side members each comprising at least two protrusions configured to interface with side mounting holes of a bare data storage drive, the first and second living hinges being bendable so that the protrusions interface with the side mounting holes of the bare data storage drive and the middle member interfaces with a back side of the bare data storage drive, the first and second living hinges being formed with a bias that applies a preload force to hold the protrusions into the side mounting holes of the bare data storage drive, the back side of the bare data storage drive facing away from a connector side of the bare data storage drive.

2. The apparatus of claim 1, wherein the middle member comprises at least one protrusion that is configured to be held in place by a cover of a hard drive enclosure.

3. The apparatus of claim 1, wherein the middle member and first and second side members form a carrier that is SFF-8301 compliant.

4. The apparatus of claim 1, wherein the apparatus comprises a carrier, and no portion of the carrier encompasses the connector side of the bare data storage drive.

5. The apparatus of claim 1, further comprising an enclosure comprising at least two first dividers near an opening of the enclosure and at least two second dividers located proximate a circuit board opposite the opening, the circuit board comprising data storage connectors, the first and second dividers comprising guiding features that interface with a carrier coupled to the bare data storage drive, the carrier comprising the middle member and first and second side members.

6. The apparatus of claim 5, wherein the first dividers comprise tabs that provide initial positioning of the carrier between the first dividers.

7. The apparatus of claim 5, wherein the second dividers comprises slots that interface with ends of the first and second side members of the carrier, the ends facing away from the middle member and the slots providing precision alignment between the connector side of the bare data storage drive and the hard drive connectors of the circuit board.

8. The apparatus of claim 5, wherein at least at least one of the first dividers and second dividers have a friction feature that offers resistance to prevent the carrier from sliding out after it is seated.

9. The apparatus of claim 8, wherein the friction features comprises a rubber-like finish.

10. The apparatus of claim 1, wherein the middle member and first and second side members form a carrier that encompasses only the back side and first and second sides of the bare data storage drive, the side mounting holes being located on the first and second sides.

11. An enclosure comprising:
a backplane circuit board comprising drive connectors located opposite an opening of the enclosure;
a plurality of upper dividers near the opening of the enclosure;
a plurality of lower dividers located proximate the backplane circuit board; and
a plurality of data storage drives each fitted with carriers that mechanically interface with guiding features of the upper and lower dividers, the carriers each comprising:
a middle member spanning a back side of the data storage drive, the back side of the data storage drive facing away from a connector side of the data storage drive; and
first and second side members coupled to first and second ends of the middle member via first and second living hinges, the first and second side members each comprising at least two protrusions configured to interface with side mounting holes of the data storage drive, the first and second living hinges bendable so that the protrusions interface with the side mounting holes of the data storage drive, the first and second living hinges being formed with a bias that applies a preload force to hold the protrusions into the side mounting holes of the bare data storage drive.

12. The enclosure of claim 11, wherein the upper dividers comprise tabs that provide initial positioning of the carriers between the upper dividers.

13. The enclosure of claim 11, wherein the lower dividers comprises dovetail slots that interface with first and second side members of the carrier, the slots providing precision alignment between the connector side of the data storage drive and the drive connectors of the circuit board.

14. The enclosure of claim 11, wherein each of the upper dividers are coupled to first and second walls of the enclosure.

15. The enclosure of claim 14, wherein the upper dividers provide structural support for the enclosure.

16. The enclosure of claim 11, wherein the lower dividers are affixed to the backplane circuit board.

17. The enclosure of claim 11, further comprising a cover that presses against protrusions of the carriers when installed to hold the data storage drives in place.

18. A method comprising
  installing a carrier onto a data storage drive, the carrier that encompassing two sides and a back side of the data storage drive, the back side facing away from a connector side of the data storage drive, the installing of the carrier onto the data storage drive comprises flexing the side members outward and aligning protrusions of the side members with side mounting holes on the disk drive the first and second living hinges formed with a bias that applies a preload force to hold the protrusions into the side mounting holes of the bare data storage drive;
  inserting the carrier and data storage drive into upper divider slots of an enclosure;
  pushing the carrier and data storage drive into the enclosure until side members of the carrier interface with lower divider slots; and
  pushing the carrier and data storage drive further into the enclosure until a connector of the data storage drive interfaces with a backplane connector of the enclosure.

19. The method of claim 18, wherein the data storage drive is a hard disk drive and further comprising installing a cover on the enclosure to hold the hard disk drive in place.

20. The method of claim 18, wherein the protrusions are held into the mounting holes by the upper and lower divider slots.

* * * * *